United States Patent
Kim

(10) Patent No.: US 9,682,623 B2
(45) Date of Patent: Jun. 20, 2017

(54) SAFE DRIVING NOTIFICATION SYSTEM USING WEARABLE DEVICE AND METHOD THEREOF

(71) Applicant: HYUNDAI MOTOR COMPANY, Seoul (KR)

(72) Inventor: Nam Joon Kim, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/929,164

(22) Filed: Oct. 30, 2015

(65) Prior Publication Data
US 2016/0207455 A1    Jul. 21, 2016

(30) Foreign Application Priority Data

Jan. 21, 2015    (KR) .................. 10-2015-0009760

(51) Int. Cl.
| | |
|---|---|
| G08B 23/00 | (2006.01) |
| B60K 28/06 | (2006.01) |
| B60W 40/08 | (2012.01) |
| B60W 50/00 | (2006.01) |
| B60W 50/14 | (2012.01) |

(52) U.S. Cl.
CPC ........... *B60K 28/066* (2013.01); *B60W 40/08* (2013.01); *B60W 2040/0818* (2013.01); *B60W 2050/0075* (2013.01); *B60W 2050/143* (2013.01); *B60W 2050/146* (2013.01); *B60W 2420/905* (2013.01)

(58) Field of Classification Search
CPC ...... G08B 21/06; B60K 28/06; B60K 28/066; B60W 2040/0818; B60W 2520/10; B60W 40/08; B60W 2050/0075; B60W 2050/143; B60W 2050/146; B60W 2420/905

USPC ....... 340/575, 576, 439, 457, 903, 436, 435; 382/103, 104; 701/301
See application file for complete search history.

(56) References Cited

U.S. PATENT DOCUMENTS

| | | | |
|---|---|---|---|
| 6,859,144 B2 * | 2/2005 | Newman | B60Q 9/008 340/436 |
| 6,946,965 B2 | 9/2005 | Young et al. | |
| 8,013,747 B2 * | 9/2011 | Chen | B60K 28/066 180/272 |
| 2005/0116829 A1 * | 6/2005 | Koenig | B60R 16/0231 340/576 |
| 2012/0069301 A1 * | 3/2012 | Hirata | A61B 3/112 351/209 |

(Continued)

FOREIGN PATENT DOCUMENTS

| | | |
|---|---|---|
| JP | 10-244892 A | 9/1998 |
| JP | 2002-367095 A | 12/2002 |

(Continued)

OTHER PUBLICATIONS

Korean Office Action dated Jan. 19, 2016 in Application No. 10-2015-0009760.

*Primary Examiner* — Anh V La
(74) *Attorney, Agent, or Firm* — McDermott Will & Emery LLP

(57) ABSTRACT

A safe driving notification system includes a wearable module including a sensor unit configured to recognize a gaze of a driver in a vehicle or a driving direction of the vehicle, and a head unit configured to judge a driver's forward gazing state based on the driver's gaze or viewing direction acquired from the wearable module and to display a warning message.

20 Claims, 2 Drawing Sheets

(56) References Cited

U.S. PATENT DOCUMENTS

2012/0229248 A1\* 9/2012 Parshionikar ......... G08B 21/06
340/3.1

FOREIGN PATENT DOCUMENTS

| | | |
|---|---|---|
| JP | 2007-183831 A | 7/2007 |
| JP | 2007-233477 A | 9/2007 |
| KR | 20110060932 A | 6/2011 |
| KR | 20120075672 A | 7/2012 |
| KR | 20120127790 A | 11/2012 |
| WO | 2012/135018 A2 | 10/2012 |

\* cited by examiner

SAFE DRIVING NOTIFICATION SYSTEM USING WEARABLE DEVICE AND METHOD THEREOF

CROSS-REFERENCE TO RELATED APPLICATION

This application claims the benefit of Korean Patent Application No. 10-2015-0009760, filed on Jan. 21, 2015 in the Korean Intellectual Property Office, the disclosure of which is hereby incorporated by reference as if fully set forth herein.

TECHNICAL FIELD

The present disclosure relates to a safe driving notification system using a wearable device and a method thereof, and more particularly, to a safe driving notification system for sensing a forward gazing state of a driver during driving through a wearable device and a method thereof.

BACKGROUND

For safe driving of a vehicle, various methods for coping with distracted or careless driving of a driver as a main reason for vehicle accidents have been proposed. Mostly, in order to judge careless driving or distracted driving, there are methods for judging careless driving or distracted driving through the shape of driver's eyes or driver's gaze.

Further, although there are many guide services to provide a safe driving alarm through a device, such as a navigation system or a black box, when a vehicle passes by the position of a speed/red light camera, there is no case in which an alarm indicating deviation of driver's gaze is provided using a wearable device.

Therefore, a case in which driver's gaze does not face forward in the driving direction and faces in other directions is frequently encountered and, thus, occupies a huge proportion of traffic accidents.

Accordingly, in order to solve safety problems during driving, a method for preventing a driver's careless mistake about driver's forward gazing contributing to a large proportion of vehicle accidents is required.

PRIOR ART DOCUMENT

Patent Document
Korean Patent Laid-open Publication No. 10-2009-0043221 (May 6, 2009)

SUMMARY

Accordingly, the present invention is directed to a safe driving notification system using a wearable device and a method thereof that substantially obviate one or more problems due to limitations and disadvantages of the related art.

An object of the present invention is to provide a safe driving notification system using a wearable device and a method thereof in which movement of a driver's head is measured or the number of times of deviation of driver's gaze in a gaze deviation direction or a deviation time of driver's gaze is calculated through a wearable module during driving and, when the number of times of deviation of driver's gaze or the deviation time is greater than a predetermined value, a safe driving alarm is sent to the driver so as to prevent traffic accidents.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a safe driving notification system using a wearable device includes a wearable module including a sensor unit configured to recognize a gaze of a driver in a vehicle or a driving direction of the vehicle and a head unit configured to judge a driver's forward gazing state based on the driver's gaze or viewing direction acquired from the wearable module and to display a warning message.

The sensor unit may include an acceleration sensor configured to measure the driving direction or velocity of the vehicle and a gyro sensor configured to sense the driver's viewing direction according to an angle set to monitor movement of the driver.

The sensor unit may further include a readout unit configured to sensing movement of the driver by reading values measured by the acceleration sensor and the gyro sensor.

The sensor unit may further include a gaze tracking sensor configured to sense the driving direction of the vehicle and the driver's viewing direction by analyzing movement of the driver's gaze according to the driving direction of the vehicle acquired from the acceleration sensor.

The wearable module may be configured to, if the driver's viewing angle deviates from the driving direction of the vehicle beyond a predetermining viewing angle range, sense deviation of the driver's gaze.

The wearable module may use a Bluetooth, Wi-Fi, or near field wireless communication method to transmit a measured value of the driver's viewing angle to the head unit or to perform mutual communication therebetween.

The wearable module may further include a calculation unit configured to, if the driver's viewing angle deviates from the driving direction of the vehicle beyond the predetermining viewing angle range, count the number of times of deviation or the deviation time and calculate the sum total thereof.

The calculation unit may be configured to transmit a danger warning signal to the head unit, if the sum total reaches a predetermined number of times or a predetermined time.

The head unit may be configured to output a pop-up message or a warning sound corresponding to the warning signal so that the driver may recognize the warning signal acquired from the calculation unit.

The head unit may be configured to, when the vehicle starts to drive after the vehicle is started up, transmit a signal regarding start of driving to the wearable module.

The head unit may be configured to scan whether or not the driver wears the wearable module and to selectively display a driving mode message regarding driving mode change.

In another aspect of the present invention, a safe driving notification method using a wearable device includes judging whether or not a driver wears a wearable module through a head unit, as a vehicle is started up, sensing the driving direction of the vehicle, upon judging that the driver wears the wearable module, sensing driver's gaze in the left or right direction based on the front of the inside of the vehicle through the wearable module in sensing of the driving direction, measuring a driver's viewing angle, acquired in sensing of the driving direction and sensing of the driver's gaze, and judging whether or not the driver's viewing angle deviates from the driving direction within or beyond a predetermined viewing angle range through the wearable module, and upon judging that the driver's viewing angle deviates from the driving direction of the vehicle beyond the predetermined viewing angle range, outputting a warning through the head unit so that the driver may recognize the deviation.

Upon judging that the driver does not wear the wearable module, a message informing the driver of wearing of the wearable module may be displayed on the head unit.

In sensing of the driving direction of the vehicle, an acceleration sensor of the wearable module may measure the driving direction or velocity of the vehicle to sense a driver's forward gazing state.

In sensing of the driving direction of the vehicle, a gyro sensor of the wearable modules may sense a driver's viewing direction according to an angle set to monitor movement of the driver's head.

In sensing of the driving direction of the vehicle, a measured value of the driver's viewing angle according to movement of the driver, acquired from the acceleration sensor or the gyro sensor, may be transmitted to a readout unit and the readout unit reads the value and thus collects a more precise measured value.

In sensing of the driver's gaze, a gaze tracking sensor of the wearable module may analyze movement of the driver's gaze to sense a driver's forward gazing state in the driving direction of the vehicle.

In judgment as to whether or not the driver's viewing angle deviates from the driving direction, if the total number of times of deviation or the deviation time calculated by a calculation unit using the value sensed in sensing of the driving direction or in sensing of the driver's gaze reaches a dangerous level, a warning signal may be transmitted to the head unit.

In output of the warning, the warning indicating a driver's forward gazing state may be informed of the driver through a display or an alarm.

In still another aspect of the present invention, a safe driving notification method using a wearable device includes determining, by the wearable device worn by a driver, a driving direction of a vehicle and a viewing direction of the driver, determining, by the wearable device, whether the viewing direction of the driver deviates from the driving direction beyond a predetermined angle, upon determination that the viewing direction of the driver deviates from the driving direction beyond the predetermined angle, transmitting a signal to a head unit of the vehicle, and upon receiving the signal, outputting, by the head unit of the vehicle, a warning.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Figure 1:
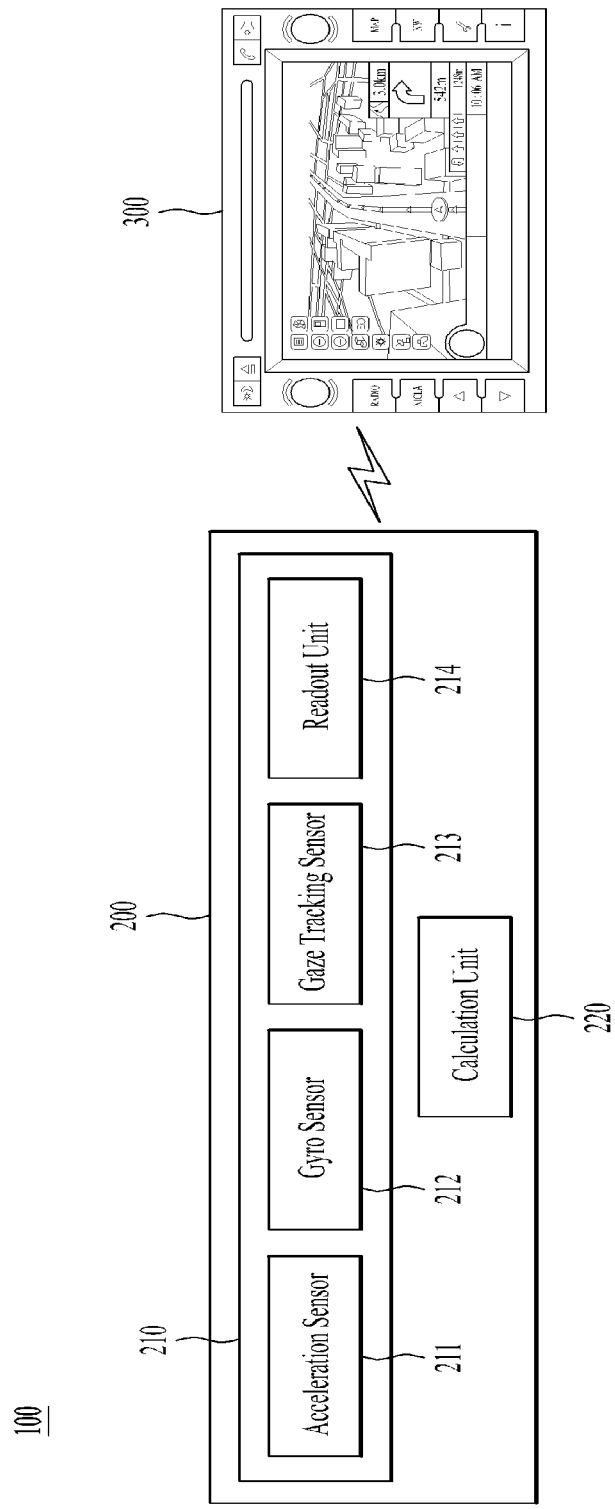
FIG. 1 is a block diagram of a safe driving notification system using a wearable device in accordance with an embodiment of the present invention.

Reference will now be made in detail to the preferred embodiments of the present invention, examples of which are illustrated in the accompanying drawings. In the drawings, the same or similar elements are denoted by the same reference numerals even though they are depicted in different drawings. In the following description of the present invention, a detailed description of known functions and configurations incorporated herein will be omitted when it may make the subject matter of the present invention rather unclear. Some features proposed in the drawings are enlarged, reduced or simplified for ease of description, and elements in the drawings are not illustrated at the appropriate rate always. However, these will be apparent to those skilled in the art.

Figure 2:
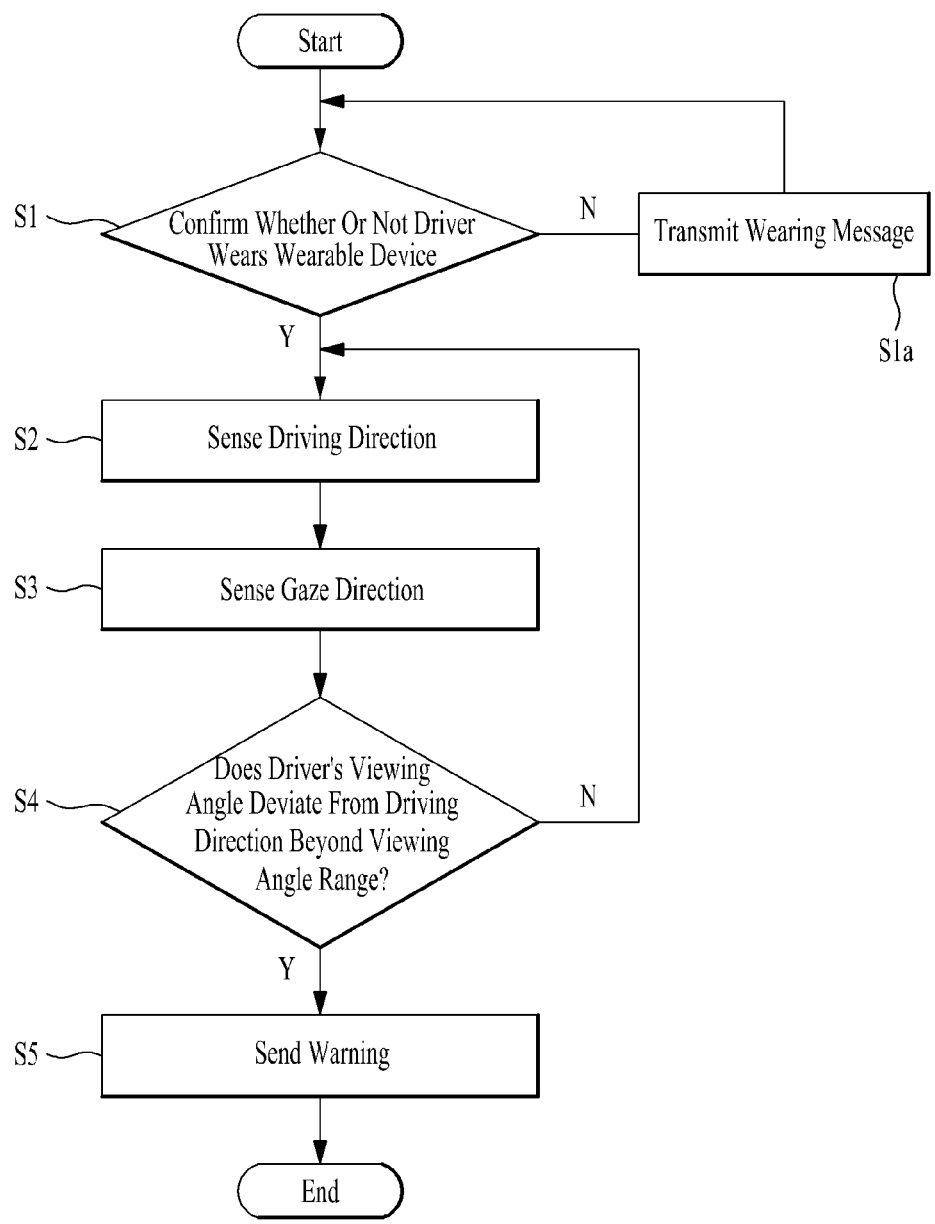
FIG. 2 is a flowchart illustrating a safe driving notification method using a wearable device in accordance with an embodiment of the present invention.

FIG. 1 is a block diagram of a safe driving notification system using a wearable device in accordance with an embodiment of the present invention, and FIG. 2 is a flowchart illustrating a safe driving notification method using a wearable device in accordance with an embodiment of the present invention.

As exemplarily shown in FIG. 1, a safe driving notification system 100 using a wearable device includes a wearable module 200 recognizing driver's gaze or a driving direction of a vehicle, and a head unit 300 judging a forward gazing state through the driver's gaze or viewing direction acquired from the wearable module 200 and displaying a warning message.

Further, the wearable module 200 serves to acquire a driver's forward gazing state in a driver's viewing direction during driving of the vehicle and includes a sensor unit 210 including an acceleration sensor 211 to measure the driving direction or the velocity of the vehicle according to the driver's gaze or viewing direction, a gyro sensor 212 to sense the driver's viewing direction according to an angle set to monitor driver's movement, a gaze tracking sensor 213 to sense the driving direction of the vehicle or the gaze direction by analyzing driver's gaze movement according to measurement of the driving direction or the velocity of the vehicle acquired from the acceleration sensor 211, and a readout unit 214 to sense driver's movement by reading the values measured by the acceleration sensor 211 and the gyro sensor 212, and a calculation unit 220 to, if the driver's viewing angle deviates from the driving direction of the vehicle or the driver's gaze direction beyond a predetermined viewing angle range, count a number of times of deviation or a deviation time and calculate the sum total thereof.

The wearable module 200 scans the driving direction or the velocity of the vehicle through the acceleration sensor 211, judges whether or not the vehicle is driving or stopping according to a driver's viewing direction, transmits a signal sensed by the acceleration sensor 211 to the readout unit 214, and generates a counting signal regarding a number of times of deviation or deviation time. This is a process for calculating a more precise value of the velocity of the vehicle sensed by the acceleration sensor 211.

Further, the wearable module 200 detects a direction by recognizing movement of a driver's head from the gyro sensor 212 and senses a driver's forward gazing state or whether or not the direction coincides with the driving direction of the vehicle within or beyond a predetermined time.

Therefore, if the driver's head rotates left, right, up, or down with reference to the vehicle and thus rotates by a predetermined angle range or more, the gyro sensor 212 senses such a rotation of the driver's head and thus measures the number of times of deviation from the forward gazing state or the deviation time.

Here, driver's viewing angle information acquired by the gyro sensor 212 may include a left and right tilting angle, an up and down moving angle, and a left and right rotating angle. If all of these angles may not be measured, the angle of the forward gazing state may be initialized such that an angle value is set to '0', i.e., the driver's head looks forward.

Thereafter, the gyro sensor 212 transmits a signal, indicating the number of times of deviation from the forward gazing state or the deviation time, to the readout unit 214 so as to calculate a more precise value of the number of times of deviation or the deviation time.

The gaze tracking sensor 213 judges an angle set according to the driving direction of the vehicle or movement of the driver's head, acquired by the gyro sensor 212, and whether or not a driver's eye direction or movement of the driver's head coincides with the driving direction of the vehicle.

Therefore, if a driver's viewing angle deviates from the driving direction of the vehicle beyond a predetermined viewing angle range, the gaze tracking sensor 213 recognizes both eyes of the driver and senses the position of the driver's gaze. This serves to detect a driver's forward gazing state and to sense driver's careless driving.

Thereby, the readout unit 214 acquires the driver's forward gazing state from the acceleration sensor 211, the gyro sensor 212 and the gaze tracking sensor 213, and compares the acquired driver's forward gazing state with a predetermined reference value.

Therefore, the readout unit 214 scans the driving direction or the velocity of the vehicle from the acceleration sensor 211, reads an angle value in the viewing direction of the driver rotating left, right, up or down based on the vehicle acquired by the gyro sensor 212 and a driver's eye direction acquired by the gaze tracking sensor 213, and transmits a combination of these values from a set value read from the readout unit 214 to the calculation unit 220.

If the driver's movement or the driver's eye direction deviates from the driving direction of the vehicle beyond a predetermined viewing angle through the set read from the read unit 214, the calculation unit 220 counts the number of times of deviation or the deviation time and calculates the sum total thereof.

Therefore, the calculation unit 220 compares the measured number of times of deviation or deviation time with a predetermined reference value and, if the measured number of times of deviation or deviation time is greater than the predetermined reference value, transmits, via a Bluetooth, Wi-Fi, or near field wireless communication method, the measured number of times of deviation or deviation time to the head unit 300 so as to output a warning signal from the head unit 300 to the driver.

Thereafter, the head unit 300 outputs the warning signal, i.e., a pop-up message or a warning sound, based on the value calculated by the calculation unit 220, so as to encourage the driver to safely drive.

Hereinafter, a safe driving notification method through the above-described safe driving notification system 100 using a wearable device will be described in detail.

As exemplarily shown in FIG. 2, the safe driving notification system 100 using a wearable device includes a wearable module 200 to sense a driver's viewing direction, movement, or gaze and to acquire a driver's forward gazing state during driving, and a head unit 300 to display information regarding the driver's forward gazing state acquired from the wearable module 200.

The safe driving notification method includes, as a vehicle is started up, determining, for example, by the head unit 300, whether or not a driver wears the wearable module 200 (Operation S1), upon determination that the driver wears the wearable module 200, sensing the driving direction of the vehicle upon judging that the driver wears the wearable module 200 in Operation S1 (Operation S2), sensing driver's gaze in the left or right direction based on the front of the inside of the vehicle through the wearable module 200 in Operation S2 (Operation S3), measuring a driver's viewing angle acquired in Operation S2 and Operation S3 and judging whether or not the measured driver's viewing angle deviates from the driving direction of the vehicle within or beyond a predetermined viewing angle range through the wearable module 200 (Operation S4), and, upon judging that the measured driver's viewing angle deviates from the driving direction of the vehicle beyond the predetermined viewing angle range in Operation S4, outputting a warning through the head unit 300 so that the driver may recognize such deviation (Operation S5).

If it is determined that the driver does not wear the wearable module 200 in Operation S1, a message or a sound informing the driver in the vehicle of wearing of the wearable module 200 is output from the head unit 300 (Operation S1a).

Further, in Operation S1, if the driver drives the vehicle without wearing the wearable module 200, Operation S1a may be carried out again and the safe driving notification system may be terminated.

In Operation S2, the driving direction or the velocity of the vehicle is measured by the acceleration sensor 211 and, thus, a driver's forward gazing state is sensed.

Further, in Operation S2, a driver's viewing direction according to an angle set to monitor movement of the driver's head is sensed by the gyro sensor 212.

In Operation S2, driver's viewing angle information may include a left and right tilting angle, an up and down moving angle, and a left and right rotating angle. If all of these angles may not be measured, the angle of the forward gazing state may be initialized such that an angle value is set to '0', i.e., the driver looks forward.

Therefore, in Operation S2, the measured value of the driver's viewing angle according to movement of the driver, acquired by the acceleration sensor 211 or the gyro sensor 212, is transmitted to the readout unit 214 so as to collect a more precise measured value.

In Operation S3, movement of the driver's gaze is analyzed by the gaze tracking sensor 213 and, thus, the driver's forward gazing state in the driving direction of the vehicle acquired by the acceleration sensor 211 or the gyro sensor 212 is sensed.

Further, in Operation S3, if the driver's viewing angle deviates from the driving direction of the vehicle beyond a predetermined viewing angle range, both eyes of the driver are recognized and, thus, the position of the driver's gaze may be sensed and driver's careless driving may be sensed.

In Operation S4, the calculation unit 220 counts the number of times of deviation or the deviation time using the value sensed by Operation S2 or Operation S3 and, if the sum total of the number of times of deviation or the deviation time reaches a dangerous level, the calculation unit 220 transmits a warning signal to the head unit 300.

In Operation S5, the head unit 300 displays or outputs a warning message or a warning sound indicating danger corresponding to the warning signal acquired from the calculation unit 220 and may thus warn the forward gazing state of the driver.

Although not shown in FIG. 2, after Operation S5, if the vehicle is still in a driving mode, the safe driving notification method may continue Operations S2 and other operations following Operation S2 until the vehicle stops.

As apparent from the above description, a safe driving notification system using a wearable device and a method thereof in accordance with the present invention may judge a driver's forward gazing state without an additional in-vehicle device, recognize the driver's forward gazing state in real time, and provide safe driving notification, thus preventing traffic accidents.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A safe driving notification system using a wearable device comprising:
   a wearable module including a sensor unit configured to recognize a driver's gaze and a driver's head movement in a vehicle, and to recognize a driving direction of the vehicle by analyzing the driver's gaze and the driver's head movement; and
   an in-vehicle head unit configured to determine a driver's forward gazing state based on a result of comparing the driver's gaze and the driver's head movement with the driving direction, acquired from the wearable module, so as to display a warning message for driving safety.

2. The safe driving notification system according to claim 1, wherein the sensor unit includes:
   an acceleration sensor configured to measure the driving direction and an acceleration of the vehicle; and
   a gyro sensor configured to sense a driver's viewing direction according to an angle set to monitor movement of the driver.

3. The safe driving notification system according to claim 2, wherein the sensor unit further includes:
   a readout unit configured to sense movement of the driver by reading values measured by the acceleration sensor and the gyro sensor.

4. The safe driving notification system according to claim 2, wherein the sensor unit further includes:
   a gaze tracking sensor configured to sense the driving direction of the vehicle and the driver's viewing direction by analyzing movement of the driver's gaze according to the driving direction of the vehicle acquired from the acceleration sensor.

5. The safe driving notification system according to claim 1, wherein the wearable module is configured to, if the driver's viewing angle deviates from the driving direction of the vehicle beyond a predetermining viewing angle range, sense deviation of the driver's gaze.

6. The safe driving notification system according to claim 5, wherein the wearable module uses a Bluetooth, Wi-Fi, or near field wireless communication method to transmit a measured value of the driver's viewing angle to the head unit or to perform mutual communication therebetween.

7. The safe driving notification system according to claim 6, wherein the wearable module further includes a calculation unit configured to, if the driver's viewing angle deviates from the driving direction of the vehicle beyond the predetermining viewing angle range, count the number of times of deviation or the deviation time and calculate the sum total thereof.

8. The safe driving notification system according to claim 7, wherein the calculation unit is configured to transmit a danger warning signal to the head unit, if the sum total reaches a predetermined number of times or a predetermined time.

9. The safe driving notification system according to claim 8, wherein the head unit is configured to output a pop-up message or a warning sound corresponding to the warning signal so that the driver may recognize the warning signal acquired from the calculation unit.

10. The safe driving notification system according to claim 1, wherein the head unit is configured to, when the vehicle starts to drive after the vehicle is started up, transmit a signal regarding start of driving to the wearable module.

11. The safe driving notification system according to claim 10, wherein the head unit is configured to scan whether or not the driver wears the wearable module and to selectively display a driving mode message regarding driving mode change.

12. A safe driving notification method using a wearable device, the method comprising:
   determining whether or not a driver wears a wearable module through an in-vehicle head unit, as a vehicle is started up;
   sensing a driving direction of the vehicle, by analyzing a driver's gaze and a driver's head movement obtained by at least one of an acceleration sensor, a gyro sensor, and a gaze tracking sensor of the wearable module, upon determining that the driver wears the wearable module;
   sensing the driver's gaze, through the gaze tracking sensor, in the left or right direction based on the front of the inside of the vehicle through the wearable module in sensing of the driving direction;
   measuring a driver's viewing angle, acquired in sensing of the driving direction and sensing of the driver's gaze, and determining whether or not the driver's viewing angle deviates from the driving direction within or beyond a predetermined viewing angle range through the wearable module based on a result of comparing the driver's gaze and the driver's head movement with the driving direction; and
   upon determining that the driver's viewing angle deviates from the driving direction of the vehicle beyond the predetermined viewing angle range, outputting a warning for driving safety through the head unit so that the driver may recognize the deviation.

13. The safe driving notification method according to claim 12, further comprising displaying a message informing the driver to wear the wearable module on the head unit, upon determining that the driver does not wear the wearable module.

14. The safe driving notification method according to claim 12, wherein, in sensing of the driving direction of the vehicle, the acceleration sensor of the wearable module measures the driving direction or velocity of the vehicle to sense a driver's forward gazing state.

15. The safe driving notification method according to claim 14, wherein, in sensing of the driving direction of the vehicle, the gyro sensor of the wearable modules senses the driver's viewing direction according to an angle set to monitor movement of the driver's head.

16. The safe driving notification method according to claim 15, wherein, in sensing of the driving direction of the vehicle, a measured value of the driver's viewing angle according to movement of the driver, acquired from the acceleration sensor or the gyro sensor, is transmitted to a readout unit and the readout unit reads the value and collects a more precise measured value.

17. The safe driving notification method according to claim 12, wherein, in sensing of the driver's gaze, the gaze tracking sensor of the wearable module analyzes movement of the driver's gaze to sense a driver's forward gazing state in the driving direction of the vehicle.

18. The safe driving notification method according to claim 12, wherein, in determination as to whether or not the driver's viewing angle deviates from the driving direction, if the total number of times of deviation or the deviation time calculated by a calculation unit using the value sensed in sensing of the driving direction or in sensing of the driver's gaze reaches a dangerous level, a warning signal is transmitted to the head unit.

19. The safe driving notification method according to claim 12, wherein, in output of the warning, the warning indicating a driver's forward gazing state is informed of the driver through a display or an alarm.

20. A safe driving notification method using a wearable device, the method comprising:
determining, by the wearable device worn by a driver, a driving direction of a vehicle and a viewing direction of the driver by analyzing a driver's gaze and a driver's head movement obtained by at least one of an acceleration sensor, a gyro sensor and a gaze tracking sensor of the wearable device;
determining, by the wearable device, whether the viewing direction of the driver deviates from the driving direction beyond a predetermined angle, based on a result of comparing the driver's gaze and the driver's head movement with the driving direction;
upon determination that the viewing direction of the driver deviates from the driving direction beyond the predetermined angle, transmitting a signal to an in-vehicle head unit of the vehicle; and
upon receiving the signal, outputting, by the head unit of the vehicle, a warning for driving safety.

* * * * *